(12) United States Patent
Cheng

(10) Patent No.: US 11,051,617 B2
(45) Date of Patent: Jul. 6, 2021

(54) TELESCOPING ADJUSTABLE LEG

(71) Applicant: Jenny Cheng, South Plainfield, NJ (US)

(72) Inventor: Jenny Cheng, South Plainfield, NJ (US)

(73) Assignee: COMPONENT HARDWARE GROUP, INC, Lakewood, NJ (US)

( * ) Notice: Subject to any disclaimer, the term of this patent is extended or adjusted under 35 U.S.C. 154(b) by 860 days.

(21) Appl. No.: 15/054,349

(22) Filed: Feb. 26, 2016

(65) Prior Publication Data

US 2017/0245640 A1    Aug. 31, 2017

(51) Int. Cl.
| | | |
|---|---|---|
| *A47B 91/02* | (2006.01) | |
| *F16B 7/18* | (2006.01) | |
| *F16B 7/00* | (2006.01) | |
| *F16M 7/00* | (2006.01) | |
| *A47L 15/42* | (2006.01) | |

(52) U.S. Cl.
CPC .......... *A47B 91/024* (2013.01); *A47B 91/022* (2013.01); *A47B 91/028* (2013.01); *F16B 7/182* (2013.01); *F16M 7/00* (2013.01); *A47B 2220/003* (2013.01); *A47L 15/4253* (2013.01); *F16M 2200/08* (2013.01)

(58) Field of Classification Search
CPC .... F16M 7/00; F16M 2200/08; A47B 91/024; A47B 91/022; A47B 91/00; A47B 13/021
USPC ......... 248/188.4, 188.5, 188.8, 188.9, 354.3, 248/188.2, 650; 52/126.7
See application file for complete search history.

(56) References Cited

U.S. PATENT DOCUMENTS

| | | | | |
|---|---|---|---|---|
| 287,913 A | * | 11/1883 | Dawson et al. ..... | A47B 91/024 16/32 |
| 563,241 A | * | 6/1896 | Wood .................. | A47B 91/024 248/188.4 |
| 972,287 A | * | 10/1910 | Swift .................. | A47B 91/024 248/188.4 |
| 1,229,830 A | * | 6/1917 | Von Der Lin et al. ..................... A47B 91/024 126/304 A | |
| 1,647,992 A | * | 11/1927 | Hartman ............. | A47B 91/024 248/188.4 |
| 2,261,061 A | * | 10/1941 | Horton ............... | A47G 25/0664 248/200.1 |
| 2,403,338 A | * | 7/1946 | Butler ................. | A47B 87/002 108/64 |
| 2,738,246 A | * | 3/1956 | Hogan, Jr. .......... | A47B 13/021 248/188.8 |
| 2,826,470 A | * | 3/1958 | Denton ................ | A47B 13/021 248/188.8 |

(Continued)

FOREIGN PATENT DOCUMENTS

| | | | | |
|---|---|---|---|---|
| DE | 472412 A | * | 12/1914 | .......... A47B 91/024 |
| DE | 0862875 A1 | * | 9/1998 | .......... A47B 91/024 |

(Continued)

*Primary Examiner* — Jonathan Liu
*Assistant Examiner* — Taylor L Morris
(74) *Attorney, Agent, or Firm* — Francis C. Hand; Carella, Byrne

(57) ABSTRACT

The telescoping adjustable leg comprises a tubular housing, a tubular toe, a cylindrical toe, a base and an externally threaded rod. The adjustable leg 10 is expandable from a fully retracted position to a fully extended position by rotation of the housing and cylindrical toe relative to the tubular toe.

10 Claims, 4 Drawing Sheets

(56) References Cited

U.S. PATENT DOCUMENTS

| | | | | |
|---|---|---|---|---|
| 2,851,091 A * | 9/1958 | Molla | A47B 91/00 | 248/188.8 |
| 2,868,602 A * | 1/1959 | Drezner | F16B 12/48 | 248/188.8 |
| 2,904,379 A * | 9/1959 | Nelson | A47B 13/003 | 108/148 |
| 2,931,128 A * | 4/1960 | Kanzelberger | A47B 91/024 | 248/188.4 |
| 3,006,606 A * | 10/1961 | Pohl | F16M 7/00 | 248/354.3 |
| 3,045,389 A * | 7/1962 | Arnit | A47B 91/024 | 248/188.4 |
| 3,398,933 A * | 8/1968 | Haroldson | A47B 91/022 | 248/354.3 |
| 3,510,159 A * | 5/1970 | Rosen | A47B 13/12 | 108/158 |
| 3,575,288 A * | 4/1971 | Brucken | A47B 91/024 | 206/320 |
| 3,960,352 A * | 6/1976 | Plattner | F16M 11/045 | 248/309.1 |
| 3,998,294 A * | 12/1976 | Moeller | E04G 5/04 | 182/229 |
| 4,042,199 A * | 8/1977 | Winkler | A47B 91/00 | 248/188.8 |
| 4,141,612 A * | 2/1979 | Rowe | A47B 96/1425 | 211/87.01 |
| 4,313,586 A * | 2/1982 | Grzesnikowski | A47B 91/024 | 248/188.4 |
| 4,456,212 A * | 6/1984 | Raftery | A47B 13/021 | 108/12 |
| 4,470,527 A * | 9/1984 | Middleton | F16B 7/10 | 223/66 |
| 4,662,591 A * | 5/1987 | Encontre | A47B 13/021 | 108/158 |
| 4,667,916 A * | 5/1987 | Richards | F16B 7/0413 | 248/343 |
| 4,723,109 A * | 2/1988 | Sheahan | E04D 13/006 | 324/696 |
| 4,889,357 A * | 12/1989 | Perry | B60D 1/66 | 280/475 |
| 4,915,334 A * | 4/1990 | White | F16M 7/00 | 248/188.4 |
| 5,497,965 A * | 3/1996 | Mathieu, Jr. | F16M 11/041 | 248/159 |
| 5,772,356 A * | 6/1998 | Collins | E04B 1/185 | 248/188.4 |
| 5,842,678 A * | 12/1998 | Svejkovsky | F16M 7/00 | 248/650 |
| 5,881,979 A * | 3/1999 | Rozier, Jr. | F16M 7/00 | 248/188.4 |
| 5,890,696 A * | 4/1999 | Ozawa | A47B 91/00 | 248/188.4 |
| 6,024,330 A * | 2/2000 | Mroz | F16M 7/00 | 248/188.4 |
| 6,027,086 A * | 2/2000 | Heitlinger | A47B 91/024 | 248/188.5 |
| 6,119,989 A * | 9/2000 | Hollington | A47B 13/02 | 248/170 |
| 6,135,401 A * | 10/2000 | Chen | A47B 91/028 | 248/188.4 |
| 6,354,231 B1 * | 3/2002 | Morris | A47B 91/028 | 108/144.11 |
| 6,407,351 B1 * | 6/2002 | Meyer | F16M 7/00 | 177/238 |
| 6,520,461 B1 * | 2/2003 | Graham | A47B 91/028 | 248/157 |
| 6,588,717 B2 * | 7/2003 | Carnahan | B63B 29/06 | 248/188.1 |
| 6,626,605 B1 * | 9/2003 | Dean | F16B 7/025 | 108/147.12 |
| 6,631,878 B1 * | 10/2003 | Adam | F24F 13/32 | 248/188.4 |
| 6,869,245 B2 * | 3/2005 | Cabiran | A47B 13/021 | 403/188 |
| 6,910,666 B2 * | 6/2005 | Burr | A47B 91/066 | 248/188.2 |
| 6,923,419 B2 * | 8/2005 | George | A47B 91/005 | 248/188.4 |
| 6,935,250 B1 * | 8/2005 | Arnold | A47B 9/04 | 108/147 |
| 6,983,570 B2 * | 1/2006 | Mead | E04F 15/02452 | 248/188.2 |
| 7,159,829 B1 * | 1/2007 | Finkelstein | B60B 33/04 | 108/144.11 |
| 7,225,694 B2 * | 6/2007 | Said | F16H 25/20 | 74/89.35 |
| 7,921,612 B2 * | 4/2011 | Knight, III | B23Q 1/0054 | 248/188.4 |
| 8,567,879 B2 * | 10/2013 | Carter | A47F 5/08 | 248/188.5 |
| 8,596,593 B2 * | 12/2013 | Saffell | A47B 13/003 | 108/156 |
| 8,714,499 B2 * | 5/2014 | Schwartz | A47B 91/024 | 248/188.2 |
| 8,757,565 B2 * | 6/2014 | Adams | F24C 15/086 | 248/176.3 |
| 9,526,347 B2 * | 12/2016 | Boyd | A47C 19/04 | |
| 10,080,436 B2 * | 9/2018 | Lillienskjold | F16M 7/00 | |
| 2002/0158173 A1 * | 10/2002 | Fisher | A47B 91/022 | 248/188.4 |
| 2005/0248239 A1 * | 11/2005 | Newhouse | A47B 9/04 | 312/194 |
| 2006/0186288 A1 * | 8/2006 | Levine | A47B 91/026 | 248/188.2 |
| 2007/0102618 A1 * | 5/2007 | Hunke | D06F 39/12 | 248/673 |
| 2009/0206231 A1 * | 8/2009 | Firman | A47B 91/024 | 248/677 |
| 2011/0148259 A1 * | 6/2011 | Justis | A47B 91/024 | 312/228 |
| 2012/0091299 A1 * | 4/2012 | Levine | A47B 91/022 | 248/188.4 |
| 2013/0240688 A1 * | 9/2013 | Schwartz | A47B 91/024 | 248/125.8 |
| 2013/0240701 A1 * | 9/2013 | Marks | F16M 7/00 | 248/295.11 |
| 2016/0032953 A1 * | 2/2016 | Papadopoulos | F16B 39/16 | 248/188.4 |
| 2017/0146180 A1 * | 5/2017 | Lillienskjold | F16M 7/00 | |

FOREIGN PATENT DOCUMENTS

| | | | | |
|---|---|---|---|---|
| DK | WO 2015192851 A1 * | 12/2015 | | F16M 7/00 |
| DK | WO 2015197065 A1 * | 12/2015 | | F16M 7/00 |
| DK | WO 2016000713 A1 * | 1/2016 | | A47B 91/024 |
| FR | 484310 A * | 9/1917 | | A47B 91/024 |
| FR | 1584970 A * | 1/1970 | | A47B 91/024 |
| KR | WO 2015102276 A1 * | 7/2015 | | A47B 91/024 |

* cited by examiner

FIG. 1
FIG. 2
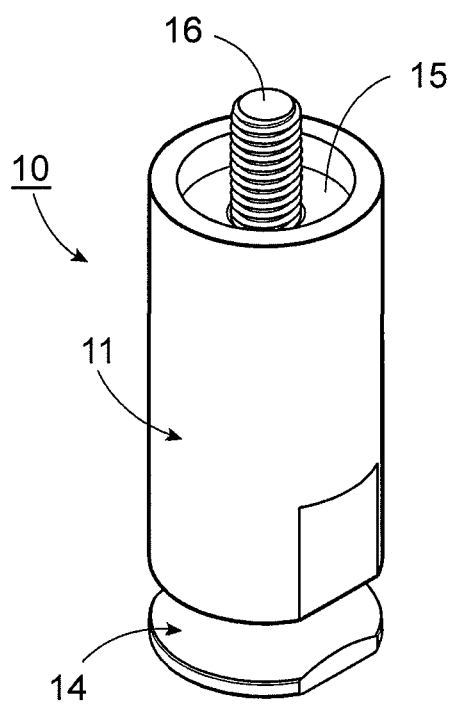
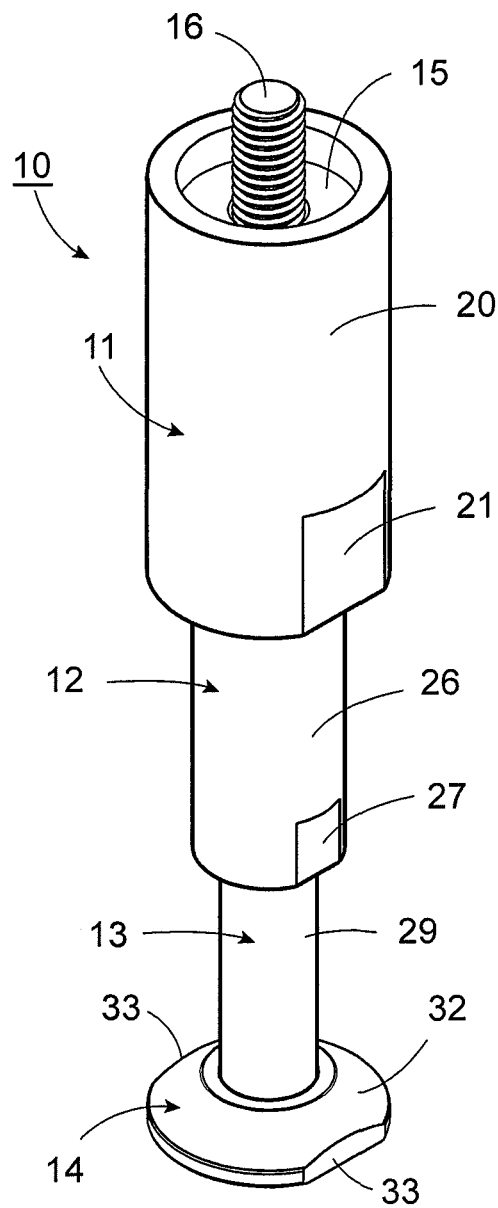

TELESCOPING ADJUSTABLE LEG

This invention relates to an adjustable leg. More particularly, this invention relates to a telescoping adjustable leg. Still more particularly, this invention relates to a telescoping adjustable leg for heavy industrial equipment, such as tables, refrigerators, ice makers, ranges, and other commercial kitchen equipment.

As is known, commercial restaurants employ equipment that is made of stainless steel or other non-corrosive materials. Typically, the equipment is relatively heavy and requires legs of considerable strength and bulk. In addition, since the equipment may be mounted on floors of uneven contour, the equipment requires legs which are adjustable in height in order to permit raising and lowering of the equipment to level the top surfaces of the equipment. The legs must also be made of materials that can be readily cleaned and that will not corrode over a period of time due to frequent cleanings with corrosive materials.

U.S. Pat. No. 6,520,461 assigned to Component Hardware Group, Inc. of Lakewood, N.J. describes a leg support that may be adjusted in height to accommodate leveling of industrial equipment. As described, legs of this type are typically made of two telescoping parts, such that the amount of adjustment is limited to a fraction of the height of the legs.

For example, where the equipment is spaced above a floor a distance of 4 inches, the height adjustment of a leg made of two telescoping parts is limited to height adjustments of up to 3 inches. Various other adjustable legs are known from U.S. Pat. Nos. 5,881,979; 6,027,086 and 8,002,224.

Accordingly, it is an object of the invention to provide an adjustment leg for commercial kitchen equipment that has a capacity for height adjustments equal to the height of the leg in a retracted position.

It is another object of the invention to provide an adjustment leg of relatively simple robust construction.

It is another object of the invention to be able to assemble an adjustment leg in a manner that makes the components of the leg non-removable.

It is another object of the invention to provide an adjustment leg of non-corrosive construction.

Briefly, the invention provides a telescoping adjustable leg of three basic parts that has a capacity for height adjustments of up to the height of the leg in a retracted position as well as a method of assembling the telescoping adjustable leg.

In accordance with the invention, the adjustable leg comprises a tubular housing, a tubular toe and a cylindrical toe that are telescoped one within the other in a non-removable manner.

The tubular housing has an internal thread while the tubular toe has a collar at one end threadably mounted in the tubular housing for movement between a retracted position within the tubular housing and an extended position projecting from the tubular housing.

The tubular toe also has an internal thread while the cylindrical toe has a collar at one end thereof threadably mounted in the tubular toe for movement between a retracted position within the tubular toe and an extended position projecting from the tubular toe.

In addition, the adjustable leg includes a base secured to a bottom end of the cylindrical toe that is of larger diameter than the cylindrical toe as well as an externally threaded rod mounted in and projecting from the tubular housing.

The base is sized and shaped to lie flat on a support surface while the threaded rod is sized to threadably engage in a piece of commercial kitchen equipment.

When secured to and under a piece of commercial kitchen equipment, the telescoping leg may be adjusted from time-to-time to level the equipment. For example, upon an initial placement of the equipment on a floor of a commercial kitchen, one or more of the legs supporting the equipment on the floor may be adjusted either manually or with the use of a tool, such as a wrench, depending on the degree of torque required to turn one or both of the tubular toe and cylindrical toe. In this latter respect, the tubular housing would typically be abutted against the underside of the equipment and would otherwise be non-rotatable.

The tubular housing may also be provided with at least a pair of oppositely disposed flats on an outer surface to facilitate wrenching of the tubular housing and threaded rod therein into a piece of commercial kitchen equipment.

Likewise, the base may be provided with at least a pair of oppositely disposed flats on an outer surface thereof to facilitate wrenching of the base should one wish to rotate the cylindrical toe and base for a height adjustment.

In accordance with the invention, the method of assembling the telescoping adjustable leg comprises an initial step of threading the cylindrical toe via the collar thereon into the tubular toe until the cylindrical toe projects from the tubular toe at one end thereof.

Thereafter, the tubular toe is threaded into one end of the tubular housing via the collar thereon until the tubular toe and cylindrical toe project from the tubular housing at the opposite end.

Next, the base is secured to the projecting cylindrical toe, for example, by peripherally welding the cylindrical toe to the base such that the cylindrical toe cannot be backed out of the tubular toe.

Thereafter, the externally threaded rod is mounted in the tubular housing. For example, the threaded rod is first threaded into a washer and then the washer is secured within the tubular housing via a peripheral weld with the rod projecting from the tubular housing. Thus, the tubular toe cannot be backed out of the tubular housing.

In accordance with the invention, each of the tubular housing, tubular toe and cylindrical toe is made of stainless steel so as to be non-corrosive and each has a smooth outer surface to facilitate cleaning and avoidance of nooks and crannies into which food debris may accumulate and create a habitat for bacterial growth. The adjustable leg may also be made of entirely plastic parts where strength is not a requirement.

These and other objects and advantages of the invention will become more apparent from the following detail description taken in conjunction with the accompanying drawings wherein:

FIG. 1 illustrates a perspective view of an adjustable leg constructed in accordance with the invention in a fully retracted position;

FIG. 2 illustrates a perspective view of the adjustable leg of FIG. 1 in a fully extended position;

Figure 3:
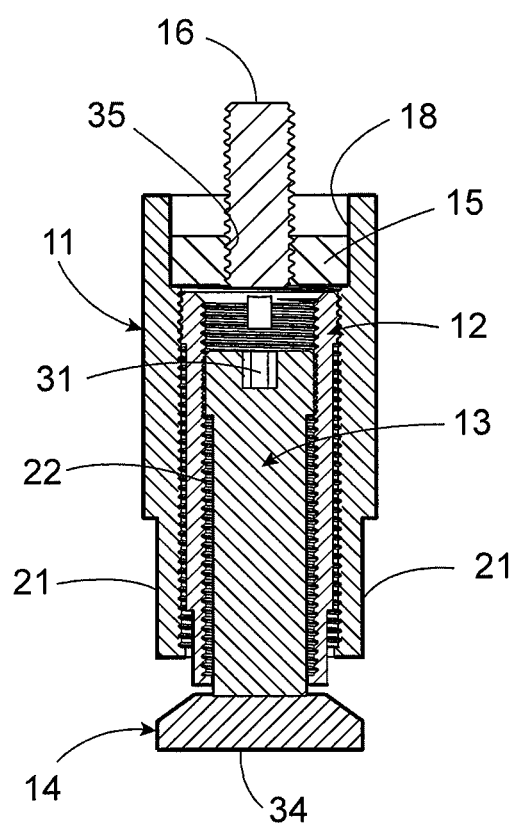
FIG. 3 illustrates a cross-sectional view of the leg in the fully retracted position of FIG. 1.

Referring to FIGS. 1 and 2, the adjustable leg 10 comprises a tubular housing 11, a tubular toe 12, a cylindrical toe 13, a base 14, a washer 15 and an externally threaded rod 16.

As indicated, the adjustable leg 10 is expandable from a fully retracted position as shown in FIG. 1 to a fully extended position as shown in FIG. 2.

The base 14 is sized and shaped to lie flat against a support surface, such as a floor of a commercial kitchen and the rod 16 is positioned to be threaded into a piece of commercial kitchen equipment (not shown).

Figure 4:
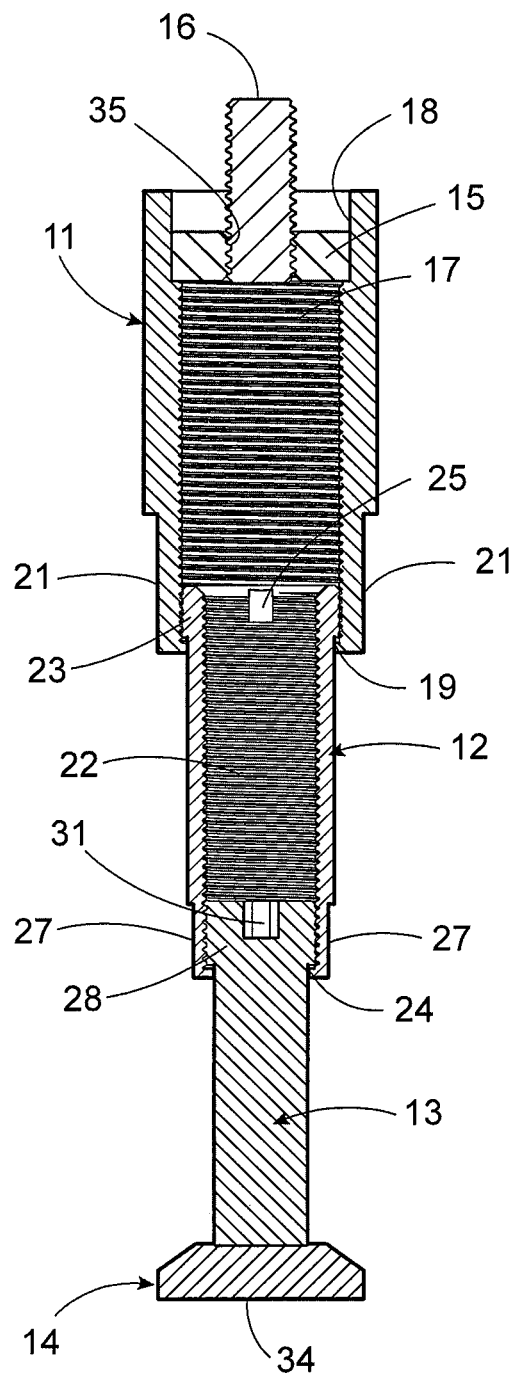
FIG. 4 illustrates a cross-sectional view of the leg in the fully extended position of FIG. 2.

Referring to FIG. 4, the tubular housing 11 has an internal thread 17, an annular recess 18 at one end and a radially inwardly directed flange 19 at an opposite end. As illustrated, the internal thread 17 extends between the recess and the flange 19.

The tubular housing 11 is made of stainless steel with a smooth outer cylindrical surface 20 (see FIG. 2). In addition, a pair of oppositely disposed flats 21 is provided on the outer surface 20 to facilitate wrenching of the tubular housing 11, for example, against a piece of commercial kitchen equipment.

The tubular toe 12 has an internal thread 22, a collar 23 at one end threadably mounted in the tubular housing 11 for movement between a retracted position within the tubular housing (FIG. 3) and an extended position projecting from the tubular housing 11 (FIG. 4) and a radially inwardly directed flange 24 at an opposite end. As illustrated, the internal thread 22 extends between the upper end of the tubular toe 12 and the flange 24.

The tubular toe 12 also has a pair of diametrically disposed and transversely crossing slots 25 (only one of which is shown) at an upper end to facilitate rotation of the tubular toe 12 via a suitable tool (not shown) into the tubular housing 11.

The tubular toe 12 is made of stainless steel with a smooth outer cylindrical surface 26 (see FIG. 2). In addition, a pair of oppositely disposed flats 27 is provided on the outer surface 26 to facilitate wrenching of the tubular toe 12, for example, during a height adjustment of a piece of commercial kitchen equipment.

The outer diameter of the surface 26 of the tubular toe 12 is less than the outer diameter of the collar 23 so that only the collar 23 transfers a load from the tubular housing 11 to the cylindrical toe 13. In addition, the outer diameter of the collar 23 is greater than the inside diameter of the inwardly directed flange 19 of the tubular housing 11 such that the tubular toe 12 cannot pass through the tubular housing 11.

The cylindrical toe 13 has a collar 28 at one end thereof threadably mounted in the tubular toe 12 for movement between a retracted position within the tubular toe 12 and an extended position projecting from the tubular toe 12.

The cylindrical toe 13 is made of stainless steel of solid cross-section with a smooth outer cylindrical surface 29 (see FIG. 2).

The outer diameter of the surface 29 of the cylindrical toe 13 is less than the outer diameter of the collar 28 so that only the collar 28 of the cylindrical toe 13 receives a load from the tubular toe 12. In addition, the outside diameter of the collar 28 is greater than the inside diameter of the flange 24 of the tubular toe 12 such that the cylindrical toe 13 cannot pass through the tubular toe 12.

Figure 5:
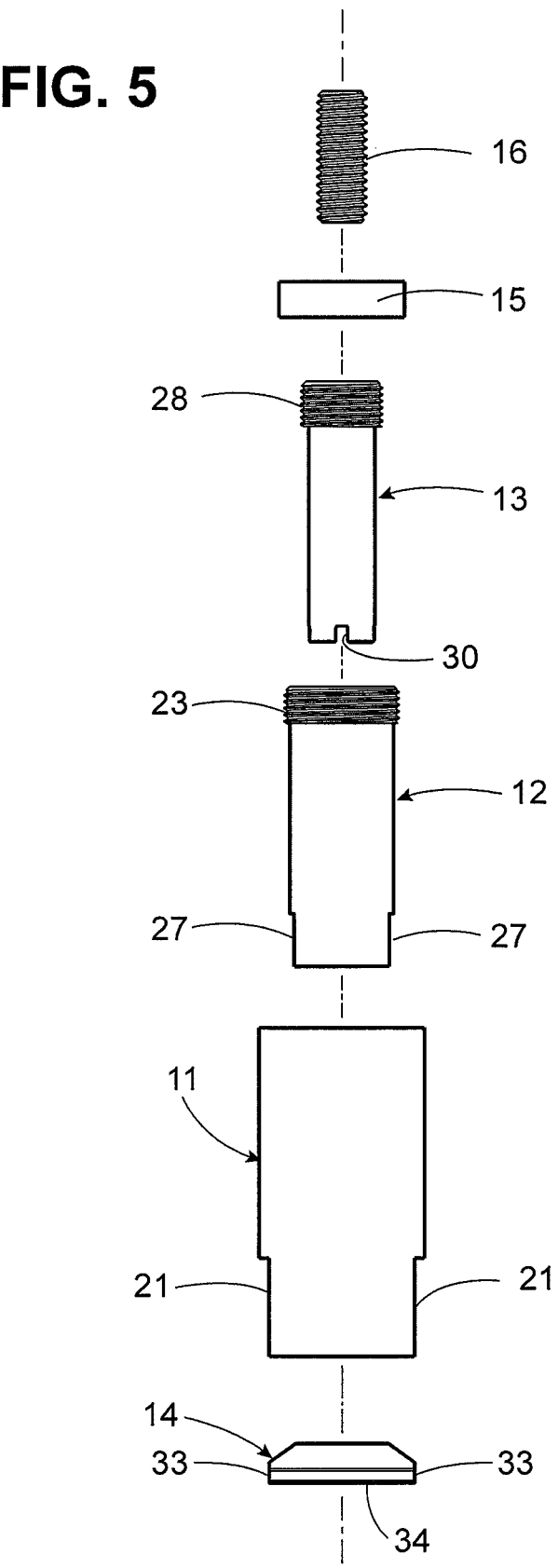
FIG. 5 schematically represents a method of assembling the adjustable leg of FIG. 1 in accordance with the invention.

The bottom end of the cylindrical toe 13 is provided with a pair of slots 30 that cross-each other transversely (only one of which is shown in FIG. 5) and that extend diametrically across the toe 13.

The upper end of the cylindrical toe 13 is provided with a socket 31, e.g. a hexagonal socket, to receive a suitable tool (not shown) for threading of the cylindrical toe 13 into the tubular toe 12.

The base 14 is secured, such as by peripherally welding a bottom end of the cylindrical toe 13 to the base 14, and is of larger diameter than the cylindrical toe 13 and of larger diameter than the tubular toe 12 as viewed in FIG. 3. Thus, after assembly of leg 10, the cylindrical toe 13 is non-removable from the tubular toe 12 and the remainder of the leg 10.

The base 14 is made of stainless steel with a smooth outer surface 32 and a pair of oppositely disposed flats 33 in an otherwise circular surface to facilitate wrenching of the base 14, for example, during assembly or during a height adjustment of a piece of commercial kitchen equipment. In addition, the base 14 has a flat bottom 34 for resting on flat surface (not shown).

The washer 15 is of circular shape and is fitted into the annular recess 18 of the tubular housing 11 and peripherally welded in place. The washer 15 is made of stainless steel or other non-corrosive material and has a central internally threaded bore 35.

The externally threaded rod 16 is mounted in the washer 15, for example, by threading into the internally threaded bore 35 in the washer 16, to project from the tubular housing 11. The rod 16 is made of stainless steel or other non-corrosive material.

Referring to FIG. 5, in order to assemble the adjustable leg 10, the cylindrical toe 13 is first threaded via the collar 28 thereon into the upper end, as viewed, of the tubular toe 12 until the cylindrical toe 13 projects from the tubular toe 12 at the lower end thereof. Threading of the cylindrical toe 13 may be carried out using a hex key or similar tool (not shown) fitted into the socket 31 at the upper end of the cylindrical toe 13 or using a suitable tool (not shown) fitted into the slot 30 at the bottom end of the cylindrical toe 13.

Thereafter, the tubular toe 12 with the cylindrical toe 13 therein is threaded into the upper end, as viewed, of the tubular housing 11 via the collar 23 thereon until the tubular toe 12 and cylindrical toe 13 project from the tubular housing 11 at the bottom end.

Next, the base 14 is secured to the projecting cylindrical toe 13, for example, by peripherally welding the base 14 to the cylindrical toe 13.

Thereafter, the externally threaded rod 16 is threaded into the bore 35 of the washer 15 and the unit of washer 15 and rod 16 is mounted in the tubular housing 11. For example, the washer 15 is secured within the recess 18 of the tubular housing 11 via a peripheral weld (not shown) with the rod 16 projecting from the tubular housing 11.

In use, the adjustable leg 10 has a capacity for height adjustments of up to the height of the leg 10 in the fully retracted position.

In one embodiment, the tubular housing 11 has an outside diameter of 1.250 inches and a length of 2.50 inches; the outer cylindrical surface 26 of the tubular toe 12 has an outside diameter of 0.785 inches and the cylindrical surface 29 of the cylindrical toe 13 has an outside diameter of 0.500 inches. The overall height of the adjustable leg 10 in the fully retracted position of FIGS. 1 and 3, is 3.00 inches from the bottom 33 of the base 14 to the top of the tubular housing 11. In the fully extended position of FIGS. 2 and 4 the overall height of the adjustable leg 10 is 6.00 inches from the bottom of the base 14 to the top of the tubular housing 11. Thus, the adjustable leg 10 may be expanded from a height of 3 inches to a height of 6 inches, i.e. by an amount equal to the height of the leg 10 in the fully retracted position.

In other embodiments, the overall height of the adjustable leg 10 in the fully retracted position of FIGS. 1 and 3, may be greater than 3.00 inches from the bottom of the base 14 to the top of the tubular housing 11, e.g. 4.00 inches, with a commensurate amount of expansion, i.e. 4.00 inches, to the fully extended position.

In use, the adjustable leg 10 is intended to be mounted on the underside of a piece of equipment in a commercial kitchen via the upwardly projecting threaded rod 16.

Adjustments in the height of the adjustable leg 10 would be made by rotating the tubular toe 12 and cylindrical toe 13 as a unit while the tubular housing 11 remains stationary. In this regard, the tubular toe 12 would thread up the tubular housing 11 while lowering the tubular housing 11 or would thread down the tubular housing 11 while raising the tubular housing 11.

The invention thus provides an adjustable leg for commercial kitchen equipment that has a capacity for height adjustments of up to the height of the leg in a fully retracted position.

The invention further provides an adjustable leg that can be assembled in an economical manner and one which cannot be readily taken apart.

What is claimed is:

1. An adjustable leg comprising
a tubular housing having an internal thread;
a tubular toe having a collar at one end thereof threadably mounted in said tubular housing for movement of said tubular toe between a retracted position within said tubular housing and an extended position projecting from said tubular housing, said tubular toe having an internal thread and at least a pair of oppositely disposed flats on an outer surface thereof;
a cylindrical toe having a collar at one end thereof threadably mounted in said tubular toe for movement between a retracted position within said tubular toe and an extended position projecting from said tubular toe;
a base secured to a bottom end of said cylindrical toe and being of larger diameter than said cylindrical toe and having a flat bottom for resting on a flat support surface; and
an externally threaded rod mounted in and projecting from said tubular housing.

2. An adjustable leg as set forth in claim 1 wherein said tubular housing has a radially inwardly directed flange at a lower end thereof for abutment of said tubular toe thereon in said extended position of said tubular toe.

3. An adjustable leg as set forth in claim 2 wherein said tubular toe has a radially inwardly directed flange at a lower end thereof for abutment of said collar of said cylindrical toe thereon in said extended position of said cylindrical toe.

4. An adjustable leg as set forth in claim 1 wherein said base is fixedly secured to said cylindrical toe and is of larger diameter than said tubular toe.

5. An adjustable leg as set forth in claim 1 wherein said externally threaded rod is fixedly mounted in said tubular housing.

6. An adjustable leg as set forth in claim 1 further comprising a washer having an internally threaded bore secured within an upper end of said tubular housing and having said rod threaded into said bore.

7. An adjustable leg comprising:
a tubular housing having an internal thread and at least a pair of oppositely disposed flats on an outer surface thereof;
a tubular toe having a collar at one end thereof threadably mounted in said tubular housing for movement of said tubular toe between a retracted position within said tubular housing and an extended position projecting from said tubular housing, said tubular toe having an internal thread;
a cylindrical toe having a collar at one end thereof threadably mounted in said tubular toe for movement between a retracted position within said tubular toe and an extended position projecting from said tubular toe;
a base secured to a bottom end of said cylindrical toe and being of larger diameter than said cylindrical toe and having a flat bottom for resting on a flat support surface; and
an externally threaded rod mounted in and projecting from said tubular housing.

8. An adjustable leg comprising
a tubular housing having an internal thread, an annular recess at an upper one end and a radially inwardly directed flange at an opposite lower end thereof;
a tubular toe having an internal thread, a collar at one an upper end thereof threadably mounted in said tubular housing for movement of said tubular toe between a retracted position within said tubular housing and an extended position projecting from said tubular housing, a radially inwardly directed flange at an opposite lower end thereof and at least a pair of oppositely disposed flats on an outer surface thereof;
a cylindrical toe having a collar at one end thereof threadably mounted in said tubular toe for movement between a retracted position within said tubular toe and an extended position projecting from said tubular toe;
a base secured to a bottom end of said cylindrical toe and being of larger diameter than said cylindrical toe;
a washer having an internally threaded bore secured within said annular recess of said tubular housing; and
an externally threaded rod threaded into said bore and projecting from said washer and said tubular housing.

9. An adjustable leg as set forth in claim 8 wherein said base has at least a pair of oppositely disposed flats on an outer surface thereof.

10. An adjustable leg comprising
a tubular housing having an internal thread, an annular recess at an upper one end, a radially inwardly directed flange at an opposite lower end thereof and at least a pair of oppositely disposed flats on an outer surface thereof;
a tubular toe having an internal thread, a collar at one an upper end thereof threadably mounted in said tubular housing for movement of said tubular toe between a retracted position within said tubular housing and an extended position projecting from said tubular housing and a radially inwardly directed flange at an opposite lower end thereof;
a cylindrical toe having a collar at one end thereof threadably mounted in said tubular toe for movement between a retracted position within said tubular toe and an extended position projecting from said tubular toe;
a base secured to a bottom end of said cylindrical toe and being of larger diameter than said cylindrical toe;
a washer having an internally threaded bore secured within said annular recess of said tubular housing; and
an externally threaded rod threaded into said bore and projecting from said washer and said tubular housing.

\* \* \* \* \*